United States Patent

Tsujishita et al.

[11] Patent Number: 5,946,292
[45] Date of Patent: Aug. 31, 1999

[54] METHOD AND DIGITAL RECEIVER FOR RECEIVING ORTHOGONAL FREQUENCY-DIVISION MULTIPLEXED SIGNALS

[75] Inventors: Masahiro Tsujishita; Kenichi Taura; Tadatoshi Ohkubo; Yoshiharu Ohsuga, all of Tokyo, Japan

[73] Assignee: Mitsubishi Denki Kabushiki Kaisha, Tokyo, Japan

[21] Appl. No.: 08/906,242

[22] Filed: Aug. 4, 1997

[30] Foreign Application Priority Data

Aug. 6, 1996 [JP] Japan ................................. 8-207382

[51] Int. Cl.$^6$ ........................................... H04J 11/00
[52] U.S. Cl. ...................... 370/204; 370/208; 375/326; 375/327
[58] Field of Search .................................. 370/203, 204, 370/208, 210, 350, 503; 375/316, 326, 327, 344; 455/182.2, 192.3

[56] References Cited

U.S. PATENT DOCUMENTS 4,894,845  1/1990  Janssen et al. ........................... 375/83
5,371,761  12/1994  Daffara et al. .

*Primary Examiner*—Jeffery A. Hofsass
*Assistant Examiner*—Clement Townsend

[57] ABSTRACT

A digital receiver uses a local oscillator to down-convert an orthogonal frequency-division multiplexed signal that has been modulated by differential phase-shift keying, and performs further processing to obtain a differentially demodulated array of phase values. According to a first aspect of the invention, the digital receiver detects a carrier offset, applies a corresponding phase correction to the values in the array, then shifts the entire array by an amount corresponding to the carrier offset. As a result, the local oscillator need be tuned only in a frequency range equal to the subcarrier spacing. According to a second aspect of the invention, the local oscillator is tuned within a range equal to the subcarrier spacing multiplied by a certain integer, the array is shifted by a multiple of this integer, and the phase correction is eliminated.

20 Claims, 6 Drawing Sheets

METHOD AND DIGITAL RECEIVER FOR RECEIVING ORTHOGONAL FREQUENCY-DIVISION MULTIPLEXED SIGNALS

BACKGROUND OF THE INVENTION

The present invention relates to a method of receiving a signal transmitted by orthogonal frequency-division multiplexing (OFDM), in which the multiplexed subcarrier signals are modulated by differential phase-shift keying, and to a digital receiver employing this method.

OFDM is particularly advantageous for broadcasting signals to mobile receivers, which must contend with such problems as multipath fading. Recommendation BS.774, drafted by the Radiotelecommunication Standardization Sector of the International Telecommunication Union (ITU-R), proposes a digital audio broadcasting standard, referred to below as DAB, in which OFDM is employed with differential phase-shift keying.

The DAB subcarrier signals are separated from one another by a constant frequency spacing, the modulated subcarriers being positioned above and below a central subcarrier which is not modulated. A conventional receiver down-converts the received signal by mixing it with the output of a local oscillator tuned in a precise frequency relationship to the central subcarrier, performs a complex Fourier transform to obtain phase information for each modulated subcarrier, then performs differential demodulation and further decoding to obtain the broadcast audio data.

A problem with this receiving method is that the local oscillator must be tunable over a comparatively wide frequency range. Local oscillators with wide tuning ranges are costly, and are also difficult to tune accurately. The conventional receiving method therefore leads to an expensive receiver with undesirable tuning error.

A simple solution to this problem would be to use a less expensive and more accurate local oscillator having a narrower tuning range, and tune the local oscillator in relation to any one of the subcarriers. If the local oscillator is not tuned in relation to the central subcarrier, the array of differentially demodulated subcarrier data will be offset by a certain number of subcarriers, but the elements in the array can be shifted in the opposite direction by the same number of subcarriers to compensate for the offset. Unfortunately, the data symbols in the DAB signal are separated by guard intervals, to prevent inter-symbol interference, and these guard intervals produce a type of error that cannot be corrected by a simple array shift. Details will be given later.

SUMMARY OF THE INVENTION

An object of the present invention is to enable a digital receiver to receive a differentially modulated OFDM signal having guard intervals, without requiring a local oscillator that can be tuned over a wide frequency range.

The invented digital receiver is a receiver of the type having a local oscillator and mixer for down-converting an OFDM signal, a processor that obtains a first array of values containing phase information of each subcarrier in the OFDM signal, a buffer memory that obtains a second array by storing and thereby delaying the first array, and a differential demodulator that obtains a differentially demodulated array representing phase differences between the first array and the second array.

According to a first aspect of the invention, the digital receiver also has a carrier offset detector that detects a carrier offset equal to an integer multiple of the subcarrier frequency spacing, a phase corrector that applies a phase correction calculated from the carrier offset, and a carrier shifter that shifts the differentially demodulated array according to the carrier offset.

If the OFDM signal has valid symbol intervals of a duration $t_S$ and guard intervals of a duration $t_G$, and if the carrier offset is m times the subcarrier frequency spacing, the phase correction preferably has a magnitude of:

$$2 \times \pi \times m \times t_G / t_S$$

The phase correction may be applied to the first array, or to the second array, or to the differentially demodulated array.

The digital receiver preferably also has a phase error detector that detects phase error in the differentially demodulated array, and a frequency controller that tunes the local oscillator in a direction that reduces the phase error.

Due to the phase correction and carrier shift performed in the first aspect of the invention, accurately demodulated data can be obtained by tuning the local oscillator within a frequency range equal to the subcarrier frequency spacing.

According to a second aspect of the invention, the digital receiver has a carrier offset detector, a frequency controller, and a carrier shifter, but no phase corrector. The frequency controller adjusts the frequency of the local oscillator by an amount that makes the carrier offset a multiple of the integer $\alpha$ closest to $t_S/t_G$, obviating the need for a phase correction.

The frequency controller preferably also adjusts the frequency of the local oscillator according to a phase error detected as in the first aspect of the invention, thereby reducing the phase error.

Due to the carrier shift performed in the second aspect of the invention, accurately demodulated data can be obtained by tuning the local oscillator within a frequency range equal to the subcarrier frequency spacing multiplied by $\alpha$.

DETAILED DESCRIPTION OF THE INVENTION

Embodiments of the invention will be described with reference to the attached illustrative drawings.

Figure 1:
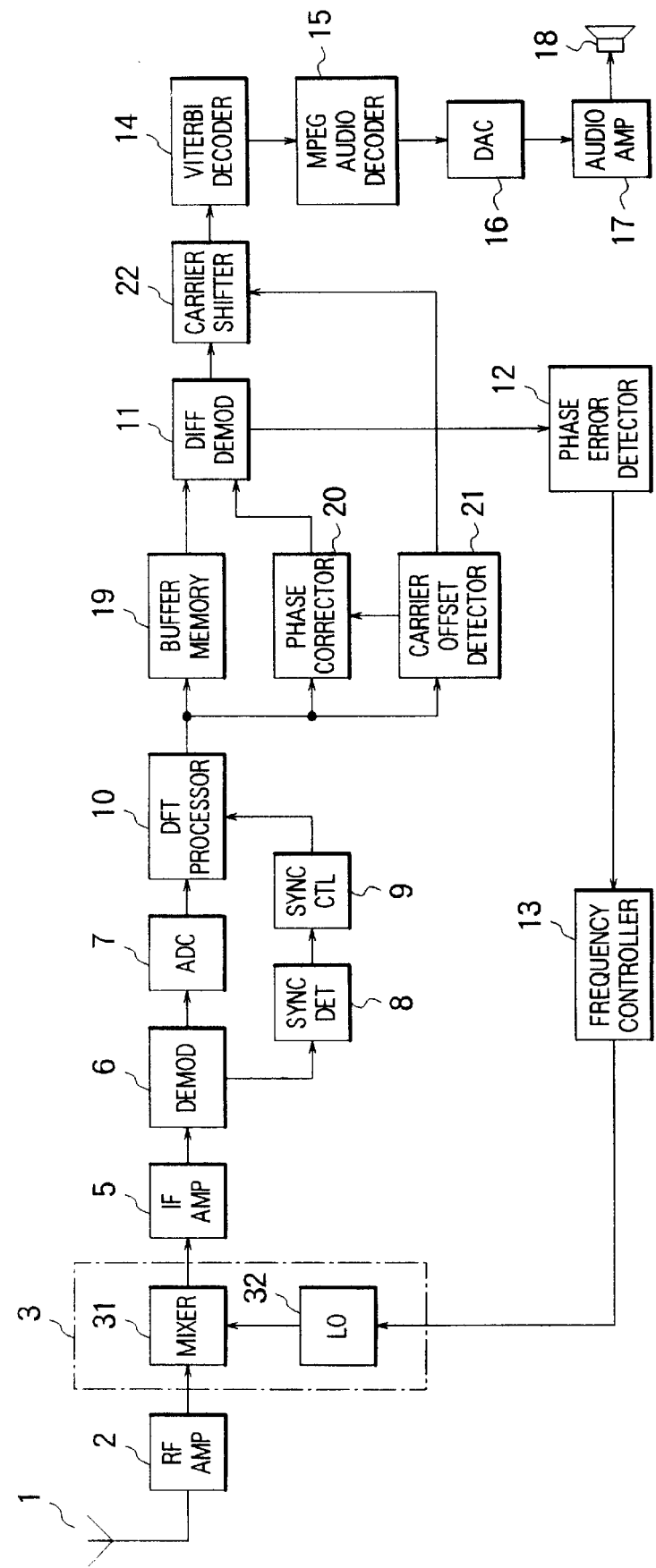
FIG. 1 is a block diagram of a first embodiment of the invention.

Referring to FIG. 1, the first embodiment is a digital receiver having an antenna 1, a radio-frequency amplifier (RF AMP) 2, a frequency converter 3 comprising a mixer (MIX) 31 and local oscillator (LO) 32, an intermediate-frequency amplifier (IF AMP) 5, an orthogonal demodulator (DEMOD) 6, an analog-to-digital converter (ADC) 7, a synchronization detector (SYNC DET) 8, a synchronization controller (SYNC CTL) 9, a discrete Fourier transform (DFT) processor 10, a differential demodulator (DIFF DEMOD) 11, a phase error detector 12, a frequency controller 13, a Viterbi decoder 14, an MPEG audio decoder 15, a digital-to-analog converter (DAC) 16, an audio amplifier 16, a loudspeaker 18, and a buffer memory 19. These elements are also found in conventional digital receivers. The local oscillator 32 is a voltage-controlled oscillator.

The novel elements in the first embodiment are a phase corrector 20, a carrier offset detector 21, and a carrier shifter 22. These elements are digital circuits that perform arithmetic and logic operations. Detailed circuit descriptions will be omitted to avoid obscuring the invention with unnecessary detail.

Incidentally, Viterbi decoding is a well-known type of maximum-likelihood decoding, and MPEG audio coding is a coding system recommended by the Motion Picture Experts Group (MPEG) and International Standards Organization (ISO).

Figure 2:
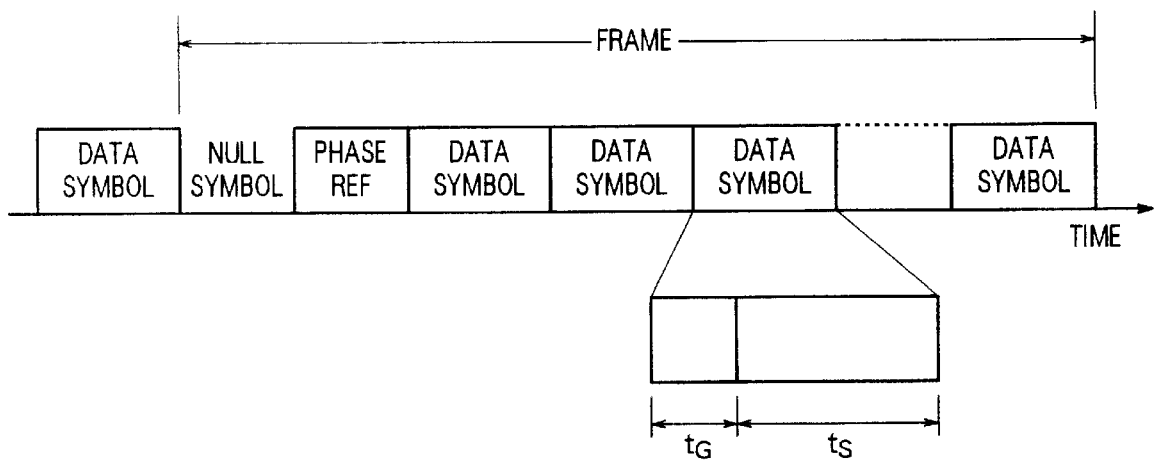
FIG. 2 illustrates the format of a DAB frame.

The first embodiment is designed to receive a signal such as a DAB signal having the format shown in FIG. 2. The signal is divided into frames, each comprising two reference symbols followed by a fixed number of data symbols. The first reference symbol is a null symbol having zero amplitude, used for frame synchronization. The second reference symbol is a phase-reference symbol. Each data symbol comprises a guard interval of duration $t_G$ and a valid symbol interval of duration $t_S$.

Frames of the type shown in FIG. 2 are transmitted simultaneously on K subcarrier signals, each modulated by differential quadrature phase-shift keying (DQPSK). K is an integer greater than one; in DAB mode one, for example, K is one thousand five hundred thirty-six (1536). The subcarrier signal frequencies are separated from one another by a subcarrier frequency spacing $\Delta f_c$ equal to the reciprocal of the valid symbol interval $t_S$.

The subcarriers are conventionally numbered in order of frequency from $-K/2$ to $K/2$. The central or zero-th subcarrier is not modulated.

The data transmitted in these frames are compressed audio data, encoded according to Layer Two of the MPEG-1 standard. The DAB recommendation establishes a specific order in which the coded audio data are assigned to the K subcarriers. For protection against transmission errors, the data are also convolutionally coded, and the convolutionally coded values are interleaved over a certain number of symbols.

Next, the operation of the first embodiment will be described.

Referring again to FIG. 1, the signal received at the antenna 1 is amplified by the radio-frequency amplifier 2 and down-converted in the mixer 31, by multiplication with the output of the local oscillator 32. Down-conversion produces an intermediate-frequency (IF) signal with frequency components equal to the difference between the frequency components present in the received signal and the frequency of the local oscillator 32.

The intermediate-frequency amplifier 5 amplifies the intermediate-frequency signal and rejects unwanted signal components such as adjacent-channel interference components. The resulting amplified intermediate-frequency signal is demodulated by an orthogonal demodulator 6, thereby being further down-shifted to a baseband frequency. The baseband signal is a complex-valued signal with an in-phase (I) component and a quadrature (Q) component.

The baseband signal is sampled and digitized by the analog-to-digital converter 7, then provided to the DFT processor 10, which performs a complex discrete Fourier transform on each symbol.

The baseband signal is also provided in analog form to the synchronization detector 8, which detects the envelope of the baseband signal. The synchronization detector 8 thereby detects the null symbol at the beginning of each frame. Based on the timing of the null symbol as reported by the synchronization detector 8, the synchronization controller 9 supplies the DFT processor 10 with timing signals that synchronize the DFT process with the symbols in each frame, establishing a window for the discrete Fourier transform performed on each symbol.

The discrete Fourier transform performed in the DFT processor 10 produces an array of, for example, two thousand forty-eight (2048) complex values representing the magnitude and phase of the baseband signal at an evenly-spaced set of frequencies, separated from one another by the subcarrier frequency spacing $\Delta f_c$. The number of complex values in the array does not have to be two thousand forty-eight, but must exceed the number K of subcarriers by an amount sufficient to allow for anticipated differences in local-oscillator frequency between the transmitter (not shown) and receiver.

The array is stored in the buffer memory 19 for one symbol interval, then supplied to the differential demodulator 11. The array is also supplied to the phase corrector 20 and carrier offset detector 21. The carrier offset detector 21 detects a carrier offset, and the phase corrector 20 applies a corresponding phase correction, details of which will be described later.

The differential demodulator 11 takes the differences between the corrected phase values of the current array, which are obtained from the phase corrector 20, and the uncorrected phase values of the preceding array, which are read from the buffer memory 19. Due to the DQPSK modulation scheme employed in the DAB signal, if the frequency of the IF signal furnished to the orthogonal demodulator 6 is correct, at the subcarrier frequencies of the DAB signal, each phase difference will have one of the four values $\pi/4$, $3\pi/4$, $5\pi/4$, and $7\pi/4$.

The phase error detector 12 multiplies the phase differences by four, divides the results by $2\pi$, and takes the remainder. At DAB subcarrier frequencies, the remainder should always be equal to $\pi$; any deviation from $\pi$ represents a phase error. The phase error detector 12 averages the difference between a certain number of these remainders and $\pi$ to obtain a differential phase error $\epsilon$ If the frequency error $\zeta$ of the baseband signal is sufficiently small, it is related to the differential phase error $\epsilon$ by the following equation, in which Tsym is the duration of one symbol, including the guard interval.

$$\zeta = \epsilon / Tsym$$

The frequency controller 13 tunes the local oscillator 32 in a direction that reduces the differential phase error $\epsilon$, thereby bringing $\epsilon$ to zero and holding $\epsilon$ substantially equal to zero. The size of the tuning adjustment can be calculated from the equation above. This tuning operation does not necessarily reduce the baseband frequency error $\zeta$ to zero, but brings $\zeta$ to an integer multiple of the subcarrier frequency spacing, so that for some integer m, $$\zeta = m \Delta f_c$$

The integer m is the carrier offset detected by the carrier offset detector 21.

Once the differential phase error $\epsilon$ has been corrected by the frequency controller 13, the array of values output by the differential demodulator 11 will contain correct data for the K subcarriers of the DAB signal. If the local oscillator 32 is correctly tuned in relation to the central subcarrier, the K subcarrier data values will occupy the central part of the array. If the local oscillator 32 is tuned to a different frequency, the positions of the subcarrier data will be shifted up or down in the array. This shift is also the carrier offset m detected by the carrier offset detector 21.

At the direction of the carrier offset detector 21, the carrier shifter 22 selects the K subcarrier data values from the array output by the differential demodulator 11. In effect, the carrier shifter 22 shifts the array by m positions to compensate for the carrier offset, then takes the K subcarrier data values from their normal positions in the shifted array.

Figure 3:
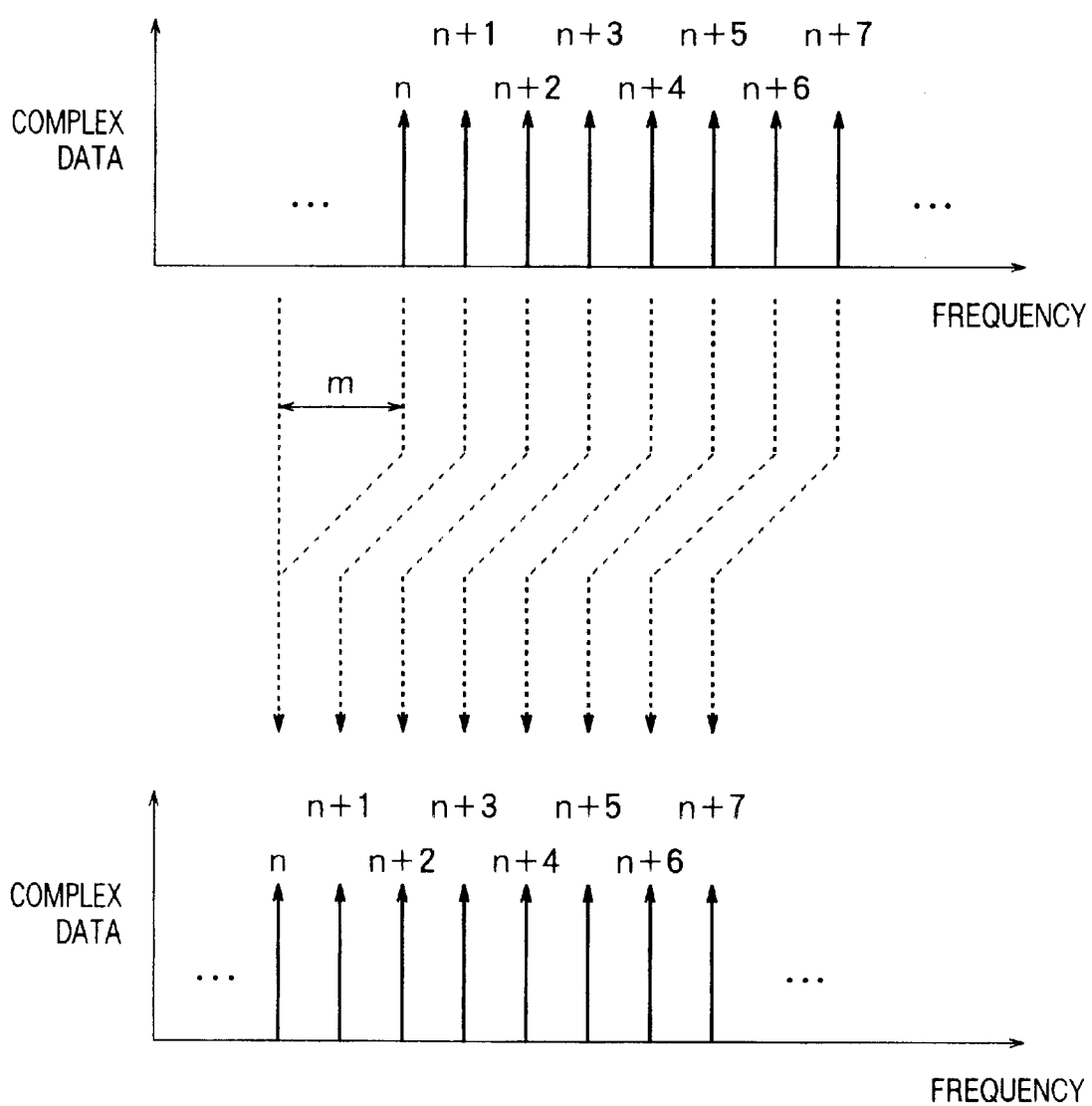
FIG. 3 illustrates the carrier-shifting operation of the first embodiment.

The carrier shifting operation is illustrated in FIG. 3. The solid arrows in FIG. 3 represent complex data in the differentially demodulated array. The numbers . . . , n, n+1, . . . , n+7, . . . correspond to array subscripts, and m is the carrier offset detected by the carrier offset detector 21. By shifting the data by m positions as indicated by the dotted arrows, the carrier shifter 22 compensates for the carrier offset. FIG. 3 illustrates a case in which the carrier offset is equivalent to twice the subcarrier frequency spacing, so the carrier shift is by two positions in the array.

As a result of this carrier shift, the carrier shifter 22 is able to furnish the Viterbi decoder 14 with K correctly arranged data values. The Viterbi decoder 14 de-interleaves and convolutionally decodes the data, thereby correcting data errors that may have occurred in transmission. The MPEG audio decoder 15 decodes the output of the Viterbi decoder 14 according to MPEG-1 decoding rules (Layer Two), thereby expanding the output of the Viterbi decoder 14 into a digital audio signal. The digital-to-analog converter 16 converts this signal to an analog signal, which is amplified by the audio amplifier 17 and reproduced through the loudspeaker 18.

Next, the operation of the phase corrector 20 and subcarrier offset detector 21 will be described in more detail.

The carrier offset detector 21 detects the carrier offset from the phase reference symbol. In the phase reference symbol, the k-th subcarrier is modulated to represent a fixed complex value $z_k$ equal to one of four values $\exp(jn\pi/2)$ (where j is the square root of minus one and n=0, 1, 2, or 3). The signal waveform s(t) of the phase reference symbol can be represented by the following equation, in which $\omega$ is a fixed angular frequency, and t is a time variable.

$$s(t) = \sum_{k=-K/2}^{K/2} z_k b(t) e^{2jk\omega t}$$

$$b(t) = \begin{matrix} 1 & 0 < t < t_s \\ 0 & \text{otherwise} \end{matrix}$$

An array of complex conjugate values $z_k^*$ of the phase reference values $z_k$ (k=-K/2 to K/2) is stored in the subcarrier offset detector 21, and is correlated with the array output by the DFT processor 10 under various assumed carrier offsets m. If the array output by the DFT processor 10 has values $Z1_k$, the carrier offset detector 21 calculates products of the form $Z1_{k-m}z_k^*$, the correlation being the sum of these products as k ranges from -K/2 to K/2. The integer m that yields the greatest correlation is detected as the carrier offset, and indicates the multiple of the subcarrier frequency spacing that is nearest to the actual frequency error $\zeta$ of the baseband signal.

The phase corrector 20 rotates the values output by the DFT processor 10 through a phase angle $Q_3$ given by the following equation, in which m is the detected carrier offset, and $t_G$ and $t_S$ are the widths of the guard interval and valid symbol interval as shown in FIG. 2.

$$Q_3 = -2 \times \pi \times m \times t_G/t_S$$

More specifically, the phase corrector 20 performs the following operation, where $Re_{i,k}$ and $Im_{i,k}$ are the real and imaginary parts of the output of the DFT processor 10 for the k-th subcarrier in the i-th symbol, and $Re'_{i,k}$ and $Im'_{i,k}$ are the real and imaginary parts as corrected by the phase corrector 20.

$$Re'_{i,k} = Re_{i,k} \cos(Q_3) - Im_{i,k} \sin(Q_3)$$

$$Im'_{i,k} = Re_{i,k} \sin(Q_3) + Im_{i,k} \cos(Q_3)$$

The reason for this phase correction is as follows.

Ideally, the local oscillator 32 is tuned in perfect relation to the central subcarrier frequency (k=0), there is no frequency error and no synchronization error, and no phase correction is necessary. The operation performed by the differential demodulator 11 can then be represented mathematically by the following equation, in which $Z0_{i,k}$ is the output of the DFT processor 10 for the k-th subcarrier in the i-th symbol, $Q_{i,k}$ is the phase angle in radians of $Z0_{i,k}$, and $Y0_{i,k}$ is the output of the differential demodulator 11 for the k-th subcarrier in the i-th symbol.

$$Y0_{i,k} = Z0_{i,k} / Z0_{i-1,k}$$

$$= \exp(jQ_{i,k}) / \exp(jQ_{i-1,k})$$

In practice, synchronization error in the timing of the DFT window leads to a certain phase error $Q_1$, frequency error leads to a further phase error of $Q_2$ per symbol, and the above phase correction $Q_3$ is applied. The differential demodulation operation is accordingly altered as in the following equation, in which $Y1_{i,k}$ and $Z1_{i,k}$ are the actual (non-ideal) outputs of the differential demodulator 11 and DFT processor 10, but $Q_{i,k}$ still represents the correct (ideal) phase angle.

$$Y1_{i,k} = Z1_{i,k} / Z1_{i-1,k}$$

$$= \exp[j(Q_{i,k} + Q_1 + Q_2 + Q_3)] / \exp[j(Q_{i-1,k} + Q_1)]$$

$$= Y0_{i,k} \exp[j(Q_2 + Q_3)]$$

The actual differentially demodulated data will have the correct values when $Y1_{i,k}$ is equal to $Y0_{i,k}$; that is, when $\exp[j(Q_2+Q_3)]$ is equal to unity. This occurs when $Q_2+Q_3$ is an integer multiple of $2\pi$.

$Q_2$ can be calculated as follows in terms of the baseband frequency error $\zeta$ and symbol interval Tsym.

$$Q_2 = 2 \times \pi \times \zeta \times Tsym$$

Since the subcarrier frequency spacing $\Delta f_c$ is equal to the reciprocal of the valid symbol interval $t_S$, the symbol interval Tsym has the following value.

$$Tsym = 1/\Delta f_c + t_G$$

When the frequency error $\zeta$ is m times the subcarrier frequency spacing $\Delta f_c$ (m being an integer), $Q_2$ has the following value.

$$Q_2 = (2 \times \pi \times m) + (2 \times \pi \times m \times t_G \times \Delta f_c)$$
$$= (2 \times \pi \times m) + (2 \times \pi \times m \times t_G / t_S)$$
$$= (2 \times \pi \times m) - Q_3$$

The following relations are therefore satisfied.

$$Q_2 + Q_3 = (2 \times \pi \times m)$$

$$\exp[j(Q_2 + Q_3)] = 1$$

$$Y1_{i,k} = Y0_{i,k}$$

The last of these relations means that, due to the phase correction $Q_3$, the differentially demodulated data have the correct (ideal) values, despite the presence of the carrier offset. The phase correction $Q_3$ cancels out the excess phase rotation that occurs during the guard interval, which cannot be corrected by the carrier shift.

The frequency control operation performed by the frequency controller 13 will now be reconsidered in terms of the carrier offset. Any baseband frequency error $\zeta$ can be expressed as an integer multiple of the subcarrier frequency spacing ($m\Delta f_c$) and a portion $\zeta'$ which is less than the subcarrier frequency spacing. The phase error detector 12 detects only $\zeta'$.

$$\zeta' = \zeta - m\Delta f_c$$

Since an alteration in the frequency of the local oscillator produces an equal alteration in the baseband frequency, the frequency controller 13 needs to tune the local oscillator 32 only within a frequency range equivalent to one subcarrier frequency spacing $\Delta f_c$ to reduce $\zeta'$ to zero. A local oscillator 32 with a tuning range on the order of $\Delta f_c$ need not be expensive, and its tuning can easily be controlled with a high degree of accuracy.

The first embodiment accordingly obtains correctly demodulated data in a receiver using an inexpensive and accurately tunable local oscillator, despite the presence of a guard interval in the signal being received, without requiring the local oscillator to be tuned to the central subcarrier frequency.

Figure 4:
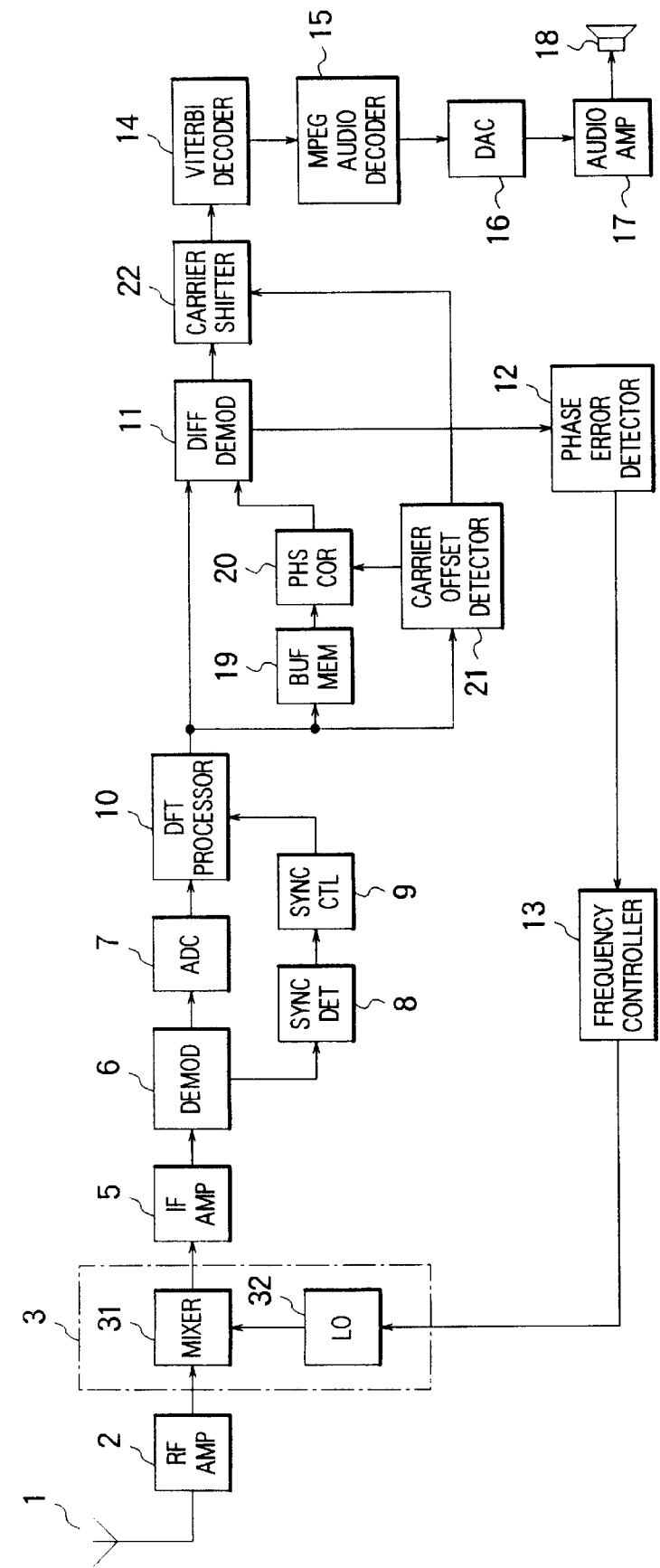
FIG. 4 is a block diagram of a second embodiment of the invention.

FIG. 4 illustrates a second embodiment of the invention, using the same reference numerals as in FIG. 1. The second embodiment differs from the first embodiment only in the position and operation of the phase corrector 20, which in the second embodiment adjusts the output of the buffer memory 19.

The phase correction $Q_4$ applied by the phase corrector 20 in the second embodiment is equal in magnitude but opposite in sign to the phase correction $Q_3$ applied in the first embodiment.

$$Q_4 = -Q_3 = 2 \times \pi \times m \times t_G / t_S$$

The differential demodulation operation in the second embodiment can be described mathematically as follows, where $Y2_{i,k}$ is the actual output of the differential demodulator 11 and $Y0_{i,k}$ is, as before, the ideal value.

$$Y2_{i,j} = \exp[j(Q_{i,k} + Q_1 + Q_2)] / \exp[j(Q_{i-1,k} + Q_1 + Q_4)]$$
$$= Y0_{i,k} \exp[j(Q_2 - Q_4)]$$
$$= Y0_{i,k} \exp[j(Q_2 + Q_3)]$$

The differentially demodulated output $Y2_{i,k}$ in the second embodiment is identical to the differentially demodulated output $Y1_{i,k}$ in the first embodiment. The second embodiment provides the same effects as the first embodiment.

Figure 5:
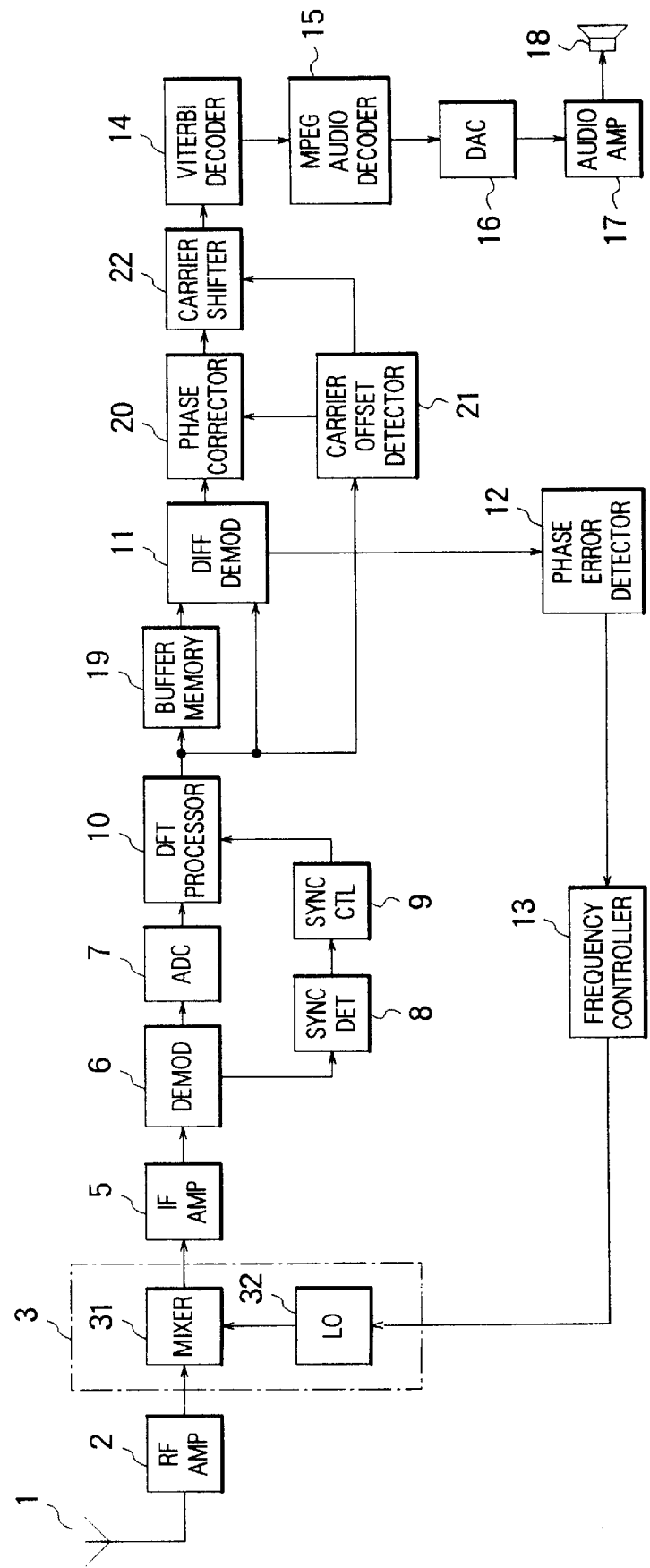
FIG. 5 is a block diagram of a third embodiment of the invention.

FIG. 5 illustrates a third embodiment of the invention, again using the same reference numerals as in FIG. 1. The third embodiment also differs from the first embodiment only in the position and operation of the phase corrector 20, which is now disposed between the differential demodulator 11 and Viterbi decoder 14, and adjusts the phase values in the differentially demodulated array output by the differential demodulator 11.

The phase correction $Q_5$ applied by the phase corrector 20 in the third embodiment is identical to the phase correction $Q_3$ applied in the first embodiment.

$$Q_5 = Q_3 = -2 \times \pi \times m \times t_G / t_S$$

The differential demodulation operation and subsequent phase correction in the third embodiment can be described mathematically as follows, where $Y3_{i,k}$ is the output of the phase corrector 20.

$$Y3_{i,k} = \exp(jQ_5)\exp[j(Q_{i,k} + Q_1 + Q_2)] / \exp[j(Q_{i-1,k} + Q_1)]$$
$$= Y0_{i,k} \exp[j(Q_2 + Q_5)]$$
$$= Y0_{i,k} \exp[j(Q_2 + Q_3)]$$

The values $Y3_{i,k}$ supplied to the Viterbi decoder 14 in the third embodiment are identical to the values $Y1_{i,k}$ supplied in the first embodiment. The third embodiment also provides the same effects as the first embodiment.

Figure 6:
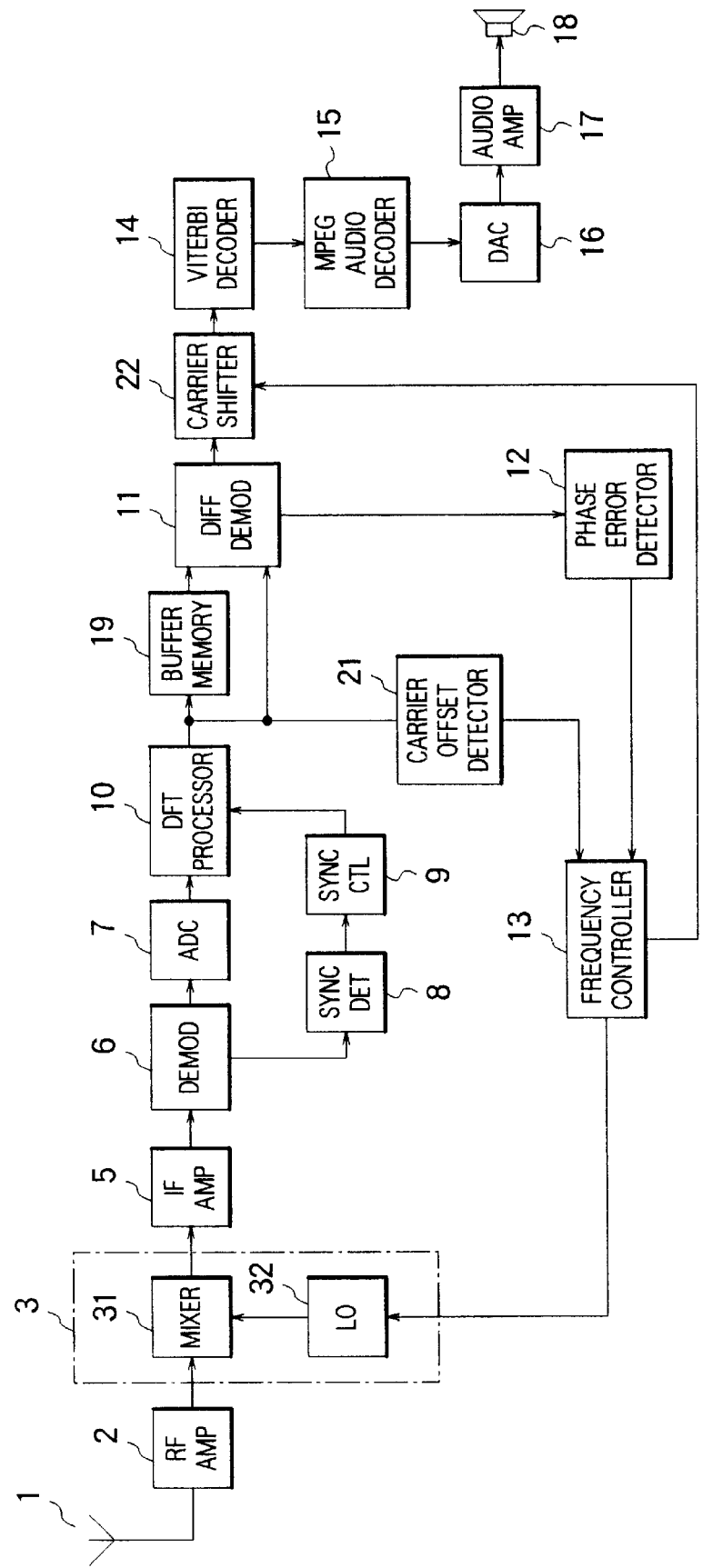
FIG. 6 is a block diagram of a fourth embodiment of the invention.

FIG. 6 illustrates a fourth embodiment of the invention, in which the operation of the frequency controller 13 is altered and the phase corrector is eliminated entirely. The carrier shifter 22 is now controlled by the frequency controller 13, instead of by the carrier offset detector 21. The other elements in the fourth embodiment are the same as in the preceding embodiments.

The phase corrections $Q_3$, $Q_4$, and $Q_5$ in the preceding embodiments were equal to $\pm 2 \times \pi \times m \times t_G / t_S$. If $m \times t_G / t_S$ is an integer, the phase correction becomes an integer multiple of $2\pi$, obviating the need for any actual correction. In the fourth embodiment, the frequency controller 13 operates so as to make $m \times t_G / t_S$ an integer.

The fourth embodiment makes use of the fact that the DAB guard interval $t_G$ is substantially equal to one-fourth the reciprocal of the subcarrier frequency spacing $\Delta f_c$, or one-fourth the valid symbol interval $t_S$.

$$t_G \cong 1 / \Delta f_c \times 0.25$$
$$\cong t_S \times 0.25$$

It follows that $t_G / t_S$ is substantially equal to one-fourth, so if the carrier offset m is a multiple of four, $m \times t_G / t_S$ will be substantially an integer.

To deal with the general case, given that the valid symbol interval $t_S$ is the reciprocal of the subcarrier frequency spacing $\Delta f_c$, let $\alpha$ be the closest integer to $t_S / t_G$. The phase correction becomes substantially unnecessary when the carrier shift is a multiple of $\alpha$. For a DAB receiver, $\alpha$ is equal to four.

The local oscillator 32 in the fourth embodiment has a variable frequency range of at least $\alpha$ times the subcarrier frequency spacing. This enables the frequency controller 13 to adjust the local oscillator 32 to a frequency that makes the carrier offset m a multiple of $\alpha$, as well as eliminating the phase error $\epsilon$ detected by the phase error detector 12.

Let Vc be the control voltage applied by the frequency controller 13 to the local oscillator 32, and let Vmin and Vmax by the minimum and maximum control voltages that can be applied. Let Dv be the amount by which the control voltage must be changed to alter the frequency of the local oscillator 32 by one subcarrier frequency spacing. The requirements for the tuning range of the local oscillator 32 can be given in terms of these quantities as follows.

$$V\min \leq Vc \leq V\max$$

$$V\max - V\min \geq \alpha Dv$$

The carrier offset m detected by the carrier offset detector 21 at the present setting (Vc) can be expressed as the sum of an integer m'' that is a multiple of $\alpha$, plus another integer m' having an absolute value less than $\alpha$. The frequency controller 13 calculates m'' and m' by, for example, dividing the detected carrier offset by $\alpha$, setting m'' equal to the integer part of the quotient, and setting m' equal to the remainder. The carrier offset m will become a multiple of $\alpha$, and m' will become zero, if the control voltage Vc is changed to the following voltage Vc'.

$$Vc' = Vc + m'Dv$$

If $V\min \leq Vc' \leq V\max$, the frequency controller 13 changes the control voltage of the local oscillator 32 to the above value Vc', and instructs the carrier shifter 22c to perform a carrier shift of m'' on subsequent symbols.

If Vc' > Vmax, the frequency controller 13 changes the control voltage of the local oscillator 32 to the following value Vc', and instructs the carrier shifter 22 to perform a subcarrier shift of (m''+$\alpha$) on subsequent symbols.

$$Vc' = Vc + (m' - \alpha)Dv$$

If Vc' < Vmin, the frequency controller 13 changes the control voltage of the local oscillator 32 to the value Vc' given below, and instructs the carrier shifter 22 to perform a subcarrier shift of (m''−$\alpha$) on subsequent symbols.

$$Vc' = Vc + (m' + \alpha)Dv$$

In addition, the frequency controller 13 adjusts the control voltage Vc' to make the phase error $\epsilon$ detected by the phase error detector 12 equal to zero. This additional tuning adjustment is normally smaller then Dv, but if this adjustment would take the control voltage below Vmin or above Vmax, the frequency controller 13 adds or subtracts $\alpha$Dv to keep Vc' between Vmin and Vmax, and alters m'' by subtracting or adding $\alpha$.

In an alternate formulation of the above control rule, the carrier shifts to be performed by the carrier shifter 22 are given in terms of m' and the detected carrier offset m as follows:

$$(m - m'), \quad \text{if} \quad V\min \leq Vc' \leq V\max$$

$$(m - m' + \alpha), \quad \text{if} \quad Vc' > V\max$$

$$(m - m' - \alpha), \quad \text{if} \quad Vc' < V\min$$

As a variation of the fourth embodiment, the carrier shifter 22 can be adapted to perform a carrier shift according to the carrier offset m detected by the carrier offset detector 21. Once the control voltage applied to the local oscillator 32 has been adjusted to Vc', the detected carrier offset m will become a multiple of $\alpha$, m' will be zero, and correctly demodulated data will be obtained.

When the local oscillator 32 is tunable over a range equal to or greater than $\alpha \Delta f_c$, the fourth embodiment is preferable to the preceding embodiments in that the phase correction process can be eliminated. The fourth embodiment is advantageous when the quantity $\alpha \Delta f_c$ is small enough that a local oscillator with a tuning range of $\alpha \Delta f_c$ can still be inexpensive, and can still be tuned accurately.

Although described above in relation to the DAB recommendation, the present invention is applicable to any orthogonal frequency-division multiplexing that employs differential phase-shift keying, with valid symbol intervals separated by guard intervals.

The subcarrier frequency spacing does not have to be equal to the reciprocal of the valid symbol interval. The subcarrier frequency spacing may be any positive integer multiple of the reciprocal of the valid symbol interval.

The carrier offset detector was described as detecting the carrier offset by correlation of the phase reference symbol, but other methods of detecting the carrier offset can be employed, such as detecting the position of the unmodulated central subcarrier.

Those skilled in the art will recognize that further variations are possible within the scope claimed below.

What is claimed is:

1. A digital receiver for receiving an OFDM signal in which a plurality of subcarriers, mutually separated by a certain subcarrier frequency spacing, are modulated by differential phase-shift keying, the digital receiver being of the type that has a local oscillator and mixer for down-converting the OFDM signal, a processor for obtaining a first array containing phase information of each subcarrier in the OFDM signal, a buffer memory for obtaining a second array by storing and thereby delaying the first array, and a differential demodulator for obtaining a differentially demodulated array representing phase differences between the first array and the second array, comprising:

a carrier offset detector for detecting, from said first array, an integer m representing a carrier offset of said first array as a multiple of said subcarrier frequency spacing;

a phase corrector coupled to said carrier offset detector, for applying a phase correction calculated from said carrier offset to one array among said first array, said second array, and said differentially demodulated array; and a carrier shifter coupled to said carrier offset detector, for shifting said differentially demodulated array according to said carrier offset and selecting data of said subcarriers from the shifted differentially demodulated array.

2. The digital receiver of claim 1, wherein said OFDM signal has valid symbol intervals of duration $t_S$, and has guard intervals of duration $t_G$ between consecutive valid symbol intervals, and said phase correction has a magnitude equal to $$2 \times \pi \times m \times t_G / t_S.$$

3. The digital receiver of claim 1, wherein said phase corrector applies said phase correction to said first array.

4. The digital receiver of claim 1, wherein said phase corrector applies said phase correction to said second array.

5. The digital receiver of claim 1, wherein said phase corrector applies said phase correction to said differentially demodulated array.

6. The digital receiver of claim 1, further comprising:

a phase error detector coupled to said differential demodulator, for detecting a phase error of said differentially demodulated array; and a frequency controller coupled to said phase error detector, for tuning said local oscillator according to said phase error.

7. The digital receiver of claim 6, wherein said frequency controller tunes said local oscillator within a frequency range not exceeding said subcarrier frequency spacing.

8. A digital receiver for receiving an OFDM signal in which a plurality of subcarriers, mutually separated by a certain subcarrier frequency spacing, are modulated by differential phase-shift keying, and in which valid symbol intervals having a duration $t_S$ are separated by guard intervals having a duration $t_G$, the digital receiver being of the type that has a local oscillator and mixer for down-converting the OFDM signal, a processor for obtaining a first array containing phase information of each subcarrier in the OFDM signal, a buffer memory for obtaining a second array by storing and thereby delaying the first array, and a differential demodulator for obtaining a differentially demodulated array representing phase differences between the first array and the second array, comprising:

a carrier offset detector for detecting, from said first array, an integer m representing a carrier offset of said first array as a multiple of said subcarrier frequency spacing;

a frequency controller coupled to said carrier offset detector, for tuning said local oscillator, thereby making said integer m a multiple of an integer $\alpha$, $\alpha$ being an integer closest to $t_S/t_G$; and a carrier shifter coupled to said differential demodulator, for shifting said differentially demodulated array according to said carrier offset and selecting data of said subcarriers from the shifted differentially demodulated array.

9. The digital receiver of claim 8, further comprising:

a phase error detector coupled to said differential demodulator, for detecting a phase error of said differentially demodulated array; wherein said frequency controller also tunes said local oscillator according to said phase error, thereby reducing said phase error.

10. The digital receiver of claim 8, wherein said frequency controller tunes said local oscillator within a frequency range not exceeding said subcarrier frequency spacing multiplied by said integer $\alpha$.

11. A method of receiving an OFDM signal in which a plurality of subcarriers, mutually separated by a certain subcarrier frequency spacing, are modulated by differential phase-shift keying, the method being of the type that down-converts the OFDM signal by mixing the OFDM signal with a signal output by a local oscillator, obtains a first array containing phase information of each subcarrier in the OFDM signal, obtains a second array by delaying the first array, and obtains a differentially demodulated array representing phase differences between the first array and the second array, comprising the steps of:

detecting, from said first array, an integer m representing a carrier offset of said first array as a multiple of said subcarrier frequency spacing;

calculating a phase correction from said carrier offset;

applying said phase correction to one array among said first array, said second array, and said differentially demodulated array;

shifting said differentially demodulated array according to said carrier offset; and selecting data of said subcarriers from the shifted differentially demodulated array.

12. The method of claim 11, wherein said OFDM signal has valid symbol intervals of duration $t_S$, and has guard intervals of duration $t_G$ between consecutive valid symbol intervals, and said phase correction has a magnitude equal to $$2 \times \pi \times m \times t_G/t_S.$$

13. The method of claim 11, wherein said phase correction is applied to said first array.

14. The method of claim 11, wherein said phase correction is applied to said second array.

15. The method of claim 11, wherein said phase correction is applied to said differentially demodulated array.

16. The method of claim 11, further comprising the steps of:

detecting a phase error of said differentially demodulated array; and tuning said local oscillator according to said phase error.

17. The method of claim 16, wherein said local oscillator is tuned within a frequency range not exceeding said subcarrier frequency spacing.

18. A method of receiving an OFDM signal in which a plurality of subcarriers, mutually separated by a certain subcarrier frequency spacing, are modulated by differential phase-shift keying, and in which valid symbol intervals having a duration $t_S$ are separated by guard intervals having a duration $t_G$, the method being of the type that down-converts the OFDM signal by mixing the OFDM signal with a signal output by a local oscillator, obtains a first array containing phase information of each subcarrier in the OFDM signal, obtains a second array by delaying the first array, and obtains a differentially demodulated array representing phase differences between the first array and the second array, comprising the steps of:

detecting, from said first array, an integer m representing a carrier offset of said first array as a multiple of said subcarrier frequency spacing;

tuning said local oscillator, thereby making said integer m a multiple of an integer $\alpha$, $\alpha$ being an integer closest to $t_S/t_G$;

shifting said differentially demodulated array according to said carrier offset; and selecting data of said subcarriers from the shifted differentially demodulated array.

19. The method of claim 18, further comprising the steps of:

detecting a phase error of said differentially demodulated array; and tuning said local oscillator according to said phase error.

20. The method of claim 18, wherein said local oscillator is tuned within a frequency range not exceeding said subcarrier frequency spacing multiplied by said integer $\alpha$.

* * * * *